US011996612B2

(12) United States Patent
Wu et al.

(10) Patent No.: US 11,996,612 B2
(45) Date of Patent: May 28, 2024

(54) MICROSTRIP LINE FILTERING RADIATION OSCILLATOR, FILTERING RADIATION UNIT, AND ANTENNA

(71) Applicant: TONGYU COMMUNICATION INC., Zhongshan (CN)

(72) Inventors: Zhonglin Wu, Zhongshan (CN); Wei Zhao, Zhongshan (CN); Cailong Yue, Zhongshan (CN); Zhenxing Tang, Zhongshan (CN)

(73) Assignee: TONGYU COMMUNICATION INC., Zhongshan (CN)

( * ) Notice: Subject to any disclaimer, the term of this patent is extended or adjusted under 35 U.S.C. 154(b) by 192 days.

(21) Appl. No.: 17/777,165

(22) PCT Filed: Nov. 22, 2019

(86) PCT No.: PCT/CN2019/120095

§ 371 (c)(1),
(2) Date: May 16, 2022

(87) PCT Pub. No.: WO2021/092995

PCT Pub. Date: May 20, 2021

(65) Prior Publication Data

US 2022/0407236 A1 Dec. 22, 2022

(30) Foreign Application Priority Data

Nov. 14, 2019 (CN) .......................... 201911114542.0

(51) Int. Cl.
*H01Q 13/08* (2006.01)
*H01Q 1/38* (2006.01)
(Continued)

(52) U.S. Cl.
CPC ............... *H01Q 13/08* (2013.01); *H01Q 1/38* (2013.01); *H01Q 1/50* (2013.01); *H01Q 5/321* (2015.01); *H01Q 9/285* (2013.01)

(58) Field of Classification Search
CPC ............ H01Q 1/243; H01Q 1/38; H01Q 1/50; H01Q 1/48; H01Q 21/28; H01Q 9/28;
(Continued)

(56) References Cited

U.S. PATENT DOCUMENTS

2016/0329642 A1 11/2016 Chainon et al.

FOREIGN PATENT DOCUMENTS

CN 203503790 U 3/2014
CN 103730728 A 4/2014
(Continued)

OTHER PUBLICATIONS

Aug. 12, 2020 International Search Report issued in International Patent Application No. PCT/CN2019/120095.
(Continued)

*Primary Examiner* — Monica C King
(74) *Attorney, Agent, or Firm* — Oliff PLC

(57) ABSTRACT

A microstrip line filtering radiation oscillator, a filtering radiation unit, and an antenna, the oscillator includes a substrate. A plurality of first metal sheets parallel to each other are arranged at intervals on a front surface of the substrate, a plurality of second metal sheets parallel to each other are arranged at intervals on a back surface of the substrate, and the first and second metal sheets are correspondingly staggered and coupled by a coupling part running through the substrate. The microstrip line filtering radiation oscillator has functions of signal radiation and interference suppression. The filtering radiation unit includes at least one oscillator and can be used in conjunction with a high-frequency radiation unit, to radiate high-
(Continued)

frequency and low-frequency signals simultaneously. The antenna includes at least one filtering radiation unit, and can transmit low-frequency and high-frequency signals simultaneously, thereby effectively improving the integration and reducing the volume of the antenna.

10 Claims, 3 Drawing Sheets

(51) Int. Cl.
*H01Q 1/50* (2006.01)
*H01Q 5/321* (2015.01)
*H01Q 9/28* (2006.01)

(58) Field of Classification Search
CPC ...... H01Q 21/24; H01Q 21/065; H01Q 13/10; H01Q 1/246; H01Q 1/521; H01Q 3/24; H01Q 21/00; H01Q 21/0006; H01Q 9/16; H01Q 9/0414; H01Q 9/30; H01Q 9/42; H01Q 3/34; H01Q 5/40; H01Q 5/48; H01Q 9/0442; H01Q 9/40; H01Q 21/29; H01Q 5/371; H01Q 13/103; H01Q 9/145; H01Q 1/2291; H01Q 21/062; H01Q 25/001; H01Q 9/04; H01Q 21/12; H01Q 5/00; H01Q 5/22; H01Q 1/36; H01Q 1/523; H01Q 5/25; H01Q 9/26; H01Q 1/242; H01Q 1/52; H01Q 21/0087; H01Q 21/0025; H01Q 9/0407; H01Q 21/064; H01Q 5/35; H01Q 3/26; H01Q 1/22; H01Q 1/2283; H01Q 21/06; H01Q 21/061; H01Q 21/22; H01Q 5/307; H01Q 9/0457; H01Q 9/045; H01Q 9/285; H01Q 1/241; H01Q 15/006; H01Q 21/26; H01Q 1/526; H01Q 1/24; H01Q 5/378; H01Q 9/0435; H01Q 1/2258; H01Q 19/028; H01Q 21/08; H01Q 9/0485; H01Q 21/30; H01Q 1/12; H01Q 15/0013; H01Q 19/005; H01Q 19/104; H01Q 3/267; H01Q 5/28; H01Q 5/42; H01Q 5/47; H01Q 1/44; H01Q 13/085; H01Q 15/24; H01Q 19/10; H01Q 19/24; H01Q 21/0093; H01Q 5/20; H01Q 5/335; H01Q 5/385; H01Q 9/065; H01Q 1/273; H01Q 1/405; H01Q 1/422; H01Q 11/14; H01Q 13/18; H01Q 3/2658; H01Q 3/28; H01Q 3/36; H01Q 3/443; H01Q 5/10; H01Q 5/50; H01Q 1/42; H01Q 13/106; H01Q 21/20; H01Q 7/00; H01Q 1/2266; H01Q 11/105; H01Q 13/06; H01Q 13/16; H01Q 13/22; H01Q 15/142; H01Q 15/16; H01Q 19/108; H01Q 19/17; H01Q 21/0031; H01Q 21/067; H01Q 23/00; H01Q 25/00; H01Q 25/007; H01Q 3/08; H01Q 3/18; H01Q 3/2664; H01Q 5/342; H01Q 9/36; H01Q 1/1271; H01Q 1/3275; H01Q 13/24; H01Q 21/0075; H01Q 3/30; H01Q 5/15; H01Q 5/321; H01Q 9/0428; H01Q 1/007; H01Q 1/02; H01Q 15/0086; H01Q 15/14; H01Q 19/06; H01Q 19/106; H01Q 19/28; H01Q 21/0037; H01Q 3/2605; H01Q 3/40; H01Q 5/357; H01Q 5/392; H01Q 9/00; H01Q 9/0471; H01Q 1/2225; H01Q 1/245; H01Q 1/32; H01Q 1/40; H01Q 13/08; H01Q 13/12; H01Q 13/20; H01Q 13/28; H01Q 15/008; H01Q 15/10; H01Q 19/02; H01Q 19/30; H01Q 21/0056; H01Q 21/068; H01Q 21/245; H01Q 21/293; H01Q 5/30; H01Q 5/314; H01Q 7/005; H01Q 9/0421; H01Q 9/0464; H04B 7/0413; H04B 7/0608; H04B 1/0053; H04B 1/38; H04B 1/401; H04B 7/024; H04B 7/0404; H04B 7/0417; H04B 7/0628; H04B 7/0632; H04B 7/0691; H04B 1/40; H04B 7/10; H04B 1/3827; H04B 15/04; H04B 7/0482; H04B 7/0639; H04B 7/0617; H04B 1/0064; H04B 1/54; H04B 1/56; H04B 7/04; H04B 7/06; H04B 7/08; H04B 5/75; H01P 1/207; H01P 1/2088; H01P 7/06; H01P 1/04; H01P 1/208; H01P 7/00; H01P 7/082; H01P 3/006; H01P 3/081; H01P 1/2053; H01P 5/028
See application file for complete search history.

(56) References Cited

FOREIGN PATENT DOCUMENTS

| | | | | | |
|---|---|---|---|---|---|
| CN | 207909619 U | | 9/2018 | | |
| CN | 110235308 A | * | 9/2019 | ............. | H01Q 1/243 |
| CN | 112701480 A | * | 4/2021 | ............... | H01Q 1/22 |
| JP | 2004-120168 A | | 4/2004 | | |
| KR | 2007-0080321 A | | 8/2007 | | |

OTHER PUBLICATIONS

Aug. 12, 2020 Written Opinion issued in International Patent Application No. PCT/CN2019/120095.

* cited by examiner

MICROSTRIP LINE FILTERING RADIATION OSCILLATOR, FILTERING RADIATION UNIT, AND ANTENNA

TECHNICAL FIELD

The present invention relates to the field of antennas, and specifically, to a microstrip line filtering radiation oscillator, a filtering radiation unit, and an antenna.

BACKGROUND

With the rapid development of communication, the fifth generation of communication has come. Due to a consideration of operating costs, the 4G+5G mode is going to become the mainstream trend of communication development. However, a 4G antenna and a 5G Massive MIMO antenna are mixed in an array, and a radiation unit of the 4G antenna causes severe interference to a radiation unit of the 5G antenna, which causes beam deformation of the Massive MIMO antenna, so that the coverage is affected and the isolation between systems is not up to standard.

To resolve the foregoing problems, a technical solution commonly used in the prior art is to insert a band-stop filter on an arm of a low-frequency radiation unit, to effectively suppress an induced current generated by a high-frequency electromagnetic wave on the low-frequency radiation unit, thereby greatly weakening an impact of the low-frequency radiation unit on a high-frequency radiation unit. However, several independent filtering structures are generally loaded. These filtering structures are lumped elements, which introduce discontinuities on arms of oscillators and also affect matching between the oscillators, to cause difficulty in achieving broadband operation and meeting needs of antenna operation.

SUMMARY

To resolve the problem of insufficient broadband caused by discontinuities introduced to oscillators due to insertion of a filter in the prior art, a first objective of the present invention is to provide a microstrip line filtering radiation oscillator.

To achieve the first objective, a specific solution adopted in the present invention is a microstrip line filtering radiation oscillator, including a substrate, where a plurality of first metal sheets that are parallel to each other and are arranged at intervals are provided on a front surface of the substrate, a plurality of second metal sheets that are parallel to each other and are arranged at intervals are provided on a back surface of the substrate, and the first metal sheets and the second metal sheets are correspondingly staggered and coupled by a coupling part running through the substrate.

In a preferable solution, both the first metal sheet and the second metal sheet include two end edges that are parallel to each other, the end edges are parallel to an edge of the substrate, the two end edges are connected by two connecting edges, and an angle between at least one of the two connecting edges and the end edge is an obtuse angle.

In a preferable solution, in a normal direction of the substrate, the first metal sheet and the second metal sheet that are staggered with each other have a coincident end edge.

Based on the microstrip line filtering radiation oscillator, a second objective of the present invention is to provide a filtering radiation unit that can be used in conjunction with a high-frequency radiation unit, to radiate a high-frequency signal and a low-frequency signal simultaneously.

To achieve the second objective, a specific solution adopted in the present invention is a filtering radiation unit, including at least one oscillator as described above.

In a preferable solution, the filtering radiation unit includes at least one oscillator pair, the oscillator pair includes two oscillators, and substrates of the two oscillators are integrally connected.

In a preferable solution, a connection line between the two substrates is parallel to connection lines between all the first metal sheets.

In a preferable solution, the filtering radiation unit includes two oscillator pairs, and connection directions of substrates in the two oscillator pairs are perpendicular to each other.

Based on the foregoing filtering radiation unit, a third objective of the present invention is to provide an antenna with good performance, small volume, and high integration.

To achieve the third objective, a specific solution adopted in the present invention is an antenna, including at least one filtering radiation unit as described above.

In a preferable solution, several high-frequency radiation units are arranged on a peripheral side of each filtering radiation unit.

In a preferable solution, four high-frequency radiation units uniformly distributed along a circumference are arranged on the peripheral side of the each filtering radiation unit.

An effect that the foregoing microstrip line filtering radiation oscillator can achieve is that the present invention utilizes the metal sheets and the coupling part provided on the substrate to form a continuous filtering structure, so that a larger bandwidth can be obtained compared with the existing method of inserting a band-stop filter. In addition, suppression of a high-frequency current can be maximized, and interference to a low-frequency current can be minimized, to transmit the low-frequency current forwardly and radiate a low-frequency signal while reversely suppressing a high-frequency induced current, to avoid interference from a high-frequency signal.

An effect that the foregoing filtering radiation unit can achieve is that with a feature that a composite oscillator conducts the low-frequency current and meanwhile suppresses the interference from the high-frequency current, the filtering radiation unit can be used in conjunction with the high-frequency radiation unit, to radiate the high-frequency signal and the low-frequency signal simultaneously.

An effect that the foregoing antenna can achieve is that the antenna can transmit the low-frequency signal and the high-frequency signal simultaneously, thereby effectively improving the integration of the antenna and reducing the volume of the antenna.

Description of drawings: 1. Substrate, 2. First metal sheet, 3. Coupling part, and 4. Second metal sheet.

DETAILED DESCRIPTION

The following clearly and completely describes the technical solutions in the embodiments of the present invention with reference to the accompanying drawings in the embodiments of the present invention. Apparently, the described embodiments are merely some embodiments of the present invention rather than all of the embodiments of the present invention. Based on the embodiments of the present invention, all other embodiments obtained by a person of ordinary skill in the art without creative efforts shall fall within the protection scope of the present invention.

Figure 1:
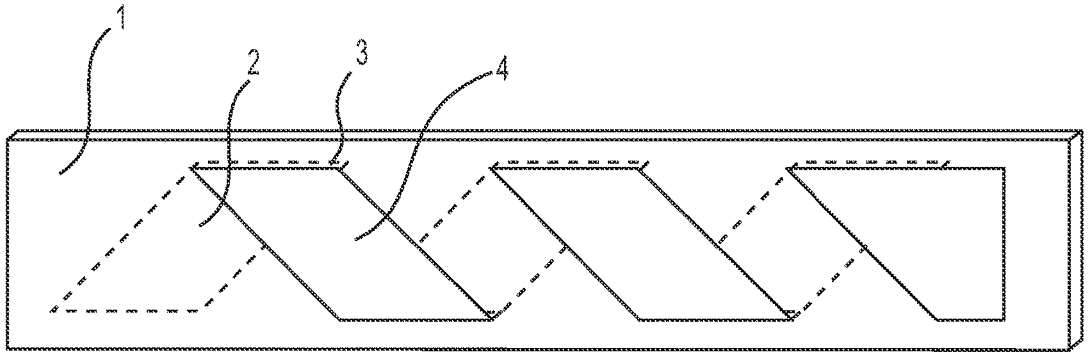
FIG. 1 is a schematic structural diagram of a microstrip line filtering radiation oscillator of the present invention.
Figure 2:
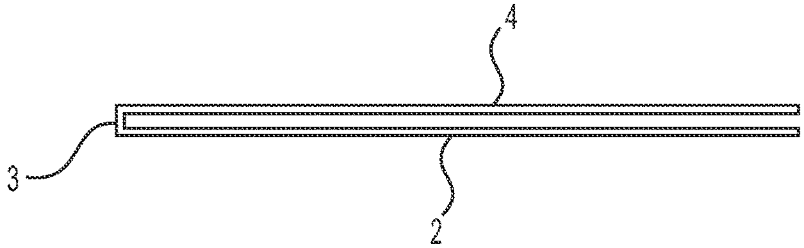
FIG. 2 is a side view of a first metal sheet, a coupling part, and a second metal sheet.

Referring to FIG. 1, a microstrip line filtering radiation oscillator includes a substrate 1. A plurality of first metal sheets 2 that are parallel to each other and are arranged at intervals are provided on a front surface of the substrate 1, a plurality of second metal sheets 4 that are parallel to each other and are arranged at intervals are provided on a back surface of the substrate 1, and the first metal sheets 2 and the second metal sheets 4 are correspondingly staggered and coupled by a coupling part 3 running through the substrate 1.

Figure 4:
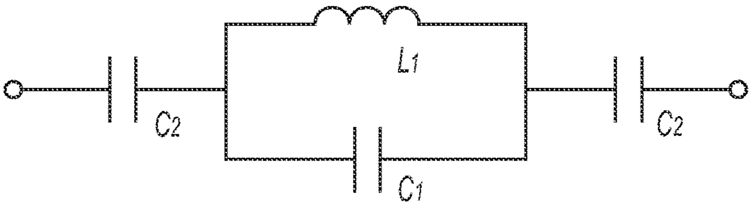
FIG. 4 is an equivalent circuit diagram of a microstrip line filtering radiation oscillator.

The first metal sheet 2, the coupling part 3, and the second metal sheet 4 may be equivalent to an LC parallel resonant circuit. The coupling part 3 is equivalent to C, and the first metal sheet 2 and the second metal sheet 4 are equivalent to L, as shown in FIG. 4. In addition, the following conditions are met:

$$\begin{cases} j2\pi f_h C_1 + \dfrac{1}{j2\pi f_h L_1} = 0 \\ \dfrac{2}{j2\pi f_l C_2} + \dfrac{1}{j2\pi f_l C_1 + \dfrac{1}{j2\pi f_l L_1}} = 0 \end{cases}$$

where j is an imaginary number, $C_1$ and $C_2$ are equivalent capacitance values, $L_1$ is an equivalent resistance value, $f_h$ is a high-frequency current frequency, and $f_l$ is a low-frequency current frequency.

At a resonant frequency, a radiation oscillator circuit is in an open-circuit state for an external electric field, and an impedance tends to be infinite. In this case, the external electric field does not generate an induced current. When the frequency is much lower than the resonant frequency, a hollow tube body provided with a spiral slit is in a state of low inductive reactance and high capacitive reactance, which has only a small impact on the low-frequency radiation and impedance matching.

Further, both the first metal sheet 2 and the second metal sheet 4 include two end edges that are parallel to each other, the end edges are parallel to an edge of the substrate 1, the two end edges are connected by two connecting edges, and an angle between at least one of the two connecting edges and the end edge is an obtuse angle. Specifically, the substrate 1 is a rectangular plate, and the end edges are parallel to a long side of the substrate 1. The first metal sheet 2 and the second metal sheet 4 may be in a shape of a parallelogram or a right trapezoid. When the first metal sheet and the second metal sheet are in the shape of the parallelogram, the two connecting edges and the end edge are at an obtuse angle. When the first metal sheet and the second metal sheet are in the shape of the right trapezoid, one connecting edge and the end edge are at an obtuse angle, and the other connecting edge and the end edge are at a right angle. It should be noted that, the parallelogram or the right trapezoid may be used in combination, but the first metal sheet 2 or the second metal sheet 4 that is in the shape of the right trapezoid needs to be arranged at the end, to be able to conduct a coupling current with a grounding part of a feeding mechanism of the radiation oscillator and strengthen the coupling.

Further, in a normal direction of the substrate 1, the first metal sheet 2 and the second metal sheet 4 that are staggered with each other have a coincident end edge.

Figure 5:
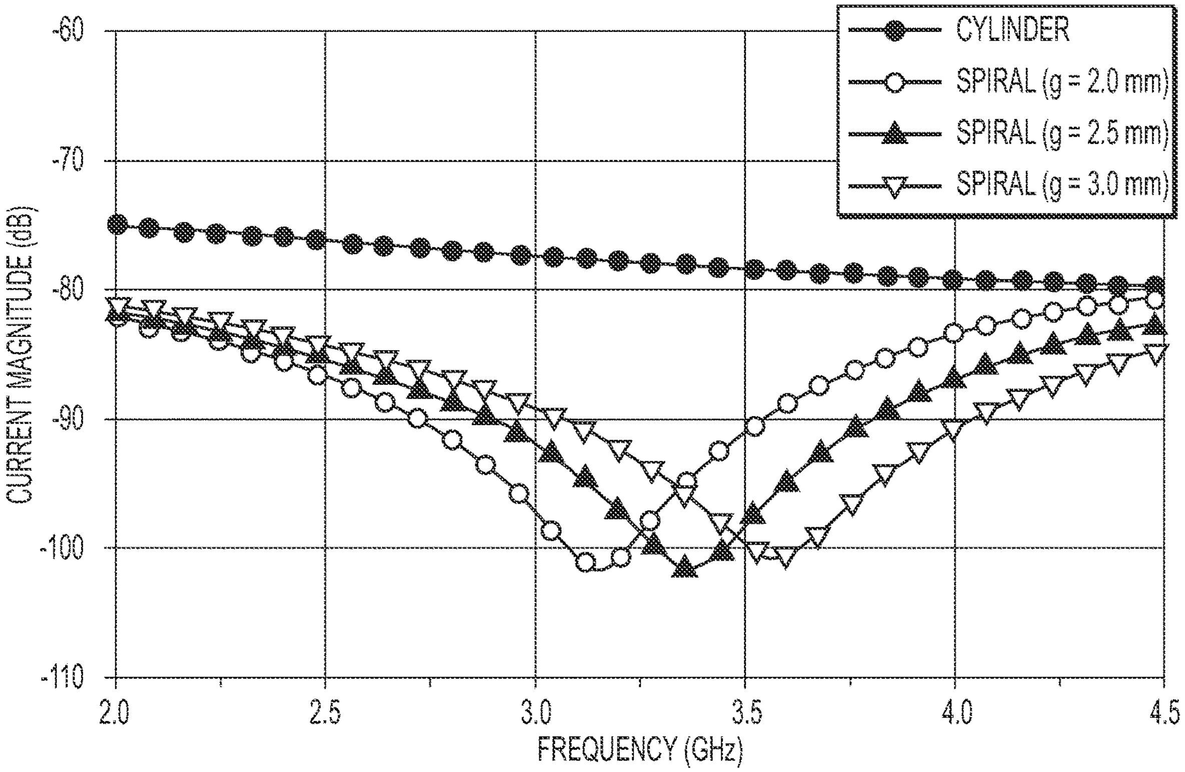
FIG. 5 is a principle diagram of adjusting parameters.
Figure 7:
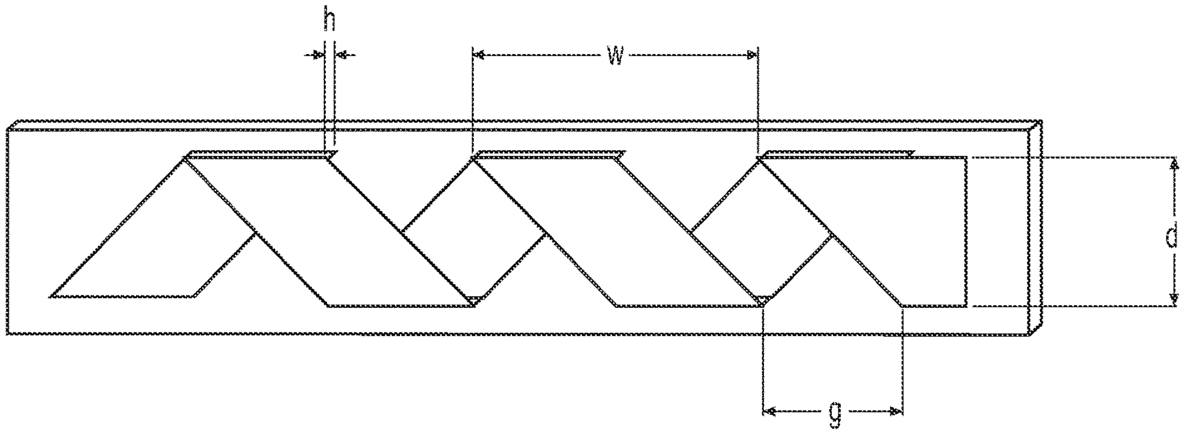
FIG. 7 is a schematic diagram of parameters.

Under the condition of a high-frequency current frequency $f_h$, the radiation oscillator appears as an open circuit, and under the condition of a low-frequency current frequency the radiation oscillator appears as a short circuit. As shown in FIG. 7, based on this, a distance between the two end edges of the radiation oscillator is defined as d, a thickness of the substrate 1 is defined as h, a distance between the two first metal sheets 2 and a distance between the two second metal sheets 4 are both defined as g, and a sum of a length of the end edge of the first metal sheet 2 and the second metal sheet 4 that are set as parallelograms and g is defined as w. By adjusting w, g, and d, suppression of a high-frequency current can be maximized, and interference to a low-frequency current can be minimized, to transmit the low-frequency current forwardly and radiate a low-frequency signal while reversely suppressing a high-frequency induced current. Moreover, because widths of the first metal sheet 2 and the second metal sheet 4 that are set as parallelograms are fixed, and the coupling part 3 is connected between overlapping parts of the first metal sheet 2 and the second metal sheet 4, a width of the coupling part 3 is equal to those of the first metal sheet 2 and the second metal sheet 4. Therefore, the radiation oscillator is uniform and continuous in an effective action area, thereby ensuring that the radiation oscillator can obtain a sufficient bandwidth. Further, a relationship between parameters is that g is directly proportional to $C_1$. When g increases, the resonant frequency of the equivalent circuit increases. As shown in FIG. 5, the horizontal coordinate in the figure is the frequency, the vertical coordinate is the intensity of the induced current on a surface of the radiation oscillator, and the black line represents the induced current magnitude on a surface of a circular tube without the spiral slit. It can be seen from the figure that the resonant frequency changes by about 0.2 GHz whenever g changes by 0.5 mm. As d increases, $L_1$ and $C_1$ increase, and then a resonant point moves toward the low-frequency direction. As w increases, $L_1$ decreases, $C_1$ increases slightly, and the resonant point moves toward the high-frequency direction.

In addition, it should be noted that, when w, g, and d are adjusted, overall requirements of the antenna need to be met, or adaptive adjustments are made to the antenna to ensure smooth installation.

In this embodiment, the substrate 1 is set as a PCB board, the first metal sheet 2 and the second metal sheet 4 are both printed on the surface of the substrate 1, and the coupling part 3 may be processed by the processing technology of plated through holes.

Figure 3:
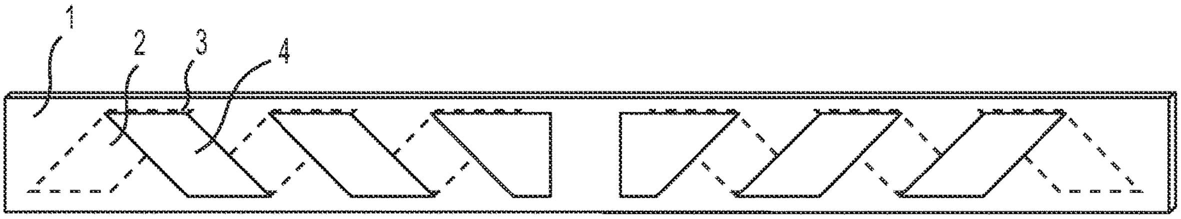
FIG. 3 is a schematic structural diagram of a filtering radiation unit of the present invention.

Referring to FIG. 3, based on the foregoing radiation oscillator, the present invention further provides a filtering radiation unit, including at least one radiation oscillator as described above. With a feature that the radiation oscillator can radiate the low-frequency signal without interfering with a nearby high-frequency signal, the filtering radiation unit can be used in conjunction with the high-frequency radiation unit, to radiate the high-frequency signal and the low-frequency signal simultaneously without interfering with each other.

Further, the filtering radiation unit includes at least one oscillator pair, the oscillator pair includes two oscillators, and substrates 1 of the two oscillators are integrally connected.

The substrates 1 of the two radiation oscillators are integrally connected, that is, the two radiation oscillators are actually located on the same substrate 1, thereby simplifying the production process and reducing the production cost.

Further, a connection line between the two substrates 1 is parallel to connection lines between all the first metal sheets 2. In this case, one oscillator pair is configured to radiate a low-frequency signal in one polarization direction.

Further, the filtering radiation unit includes two oscillator pairs, and connection directions of substrates 1 in the two oscillator pairs are perpendicular to each other.

The two oscillator pairs are respectively configured to radiate low-frequency signals in two polarization directions, and the low-frequency signals in the two polarization directions are in an orthogonal state, that is, a dual-polarization radiation function is realized.

Based on the foregoing filtering radiation unit, the present invention further provides an antenna, including at least one filtering radiation unit as described above.

Further, several high-frequency radiation units are arranged on a peripheral side of each filtering radiation unit.

The high-frequency radiation unit is configured to radiate the high-frequency signal. Because the filtering radiation unit may conduct the low-frequency current to radiate the low-frequency signal while suppressing the high-frequency current, to prevent the high-frequency signal from being interfered with by the low-frequency signal, such a combination can transmit the low-frequency signal and the high-frequency signal simultaneously, thereby effectively improving the integration of the antenna and reducing the volume of the antenna. For example, the filtering radiation unit is configured to transmit a low-frequency 4G signal, and a high-frequency radiation unit 3 is configured to transmit a high-frequency 5G signal.

Further, four high-frequency radiation units uniformly distributed along a circumference are arranged on the peripheral side of the each filtering radiation unit.

Figure 6:
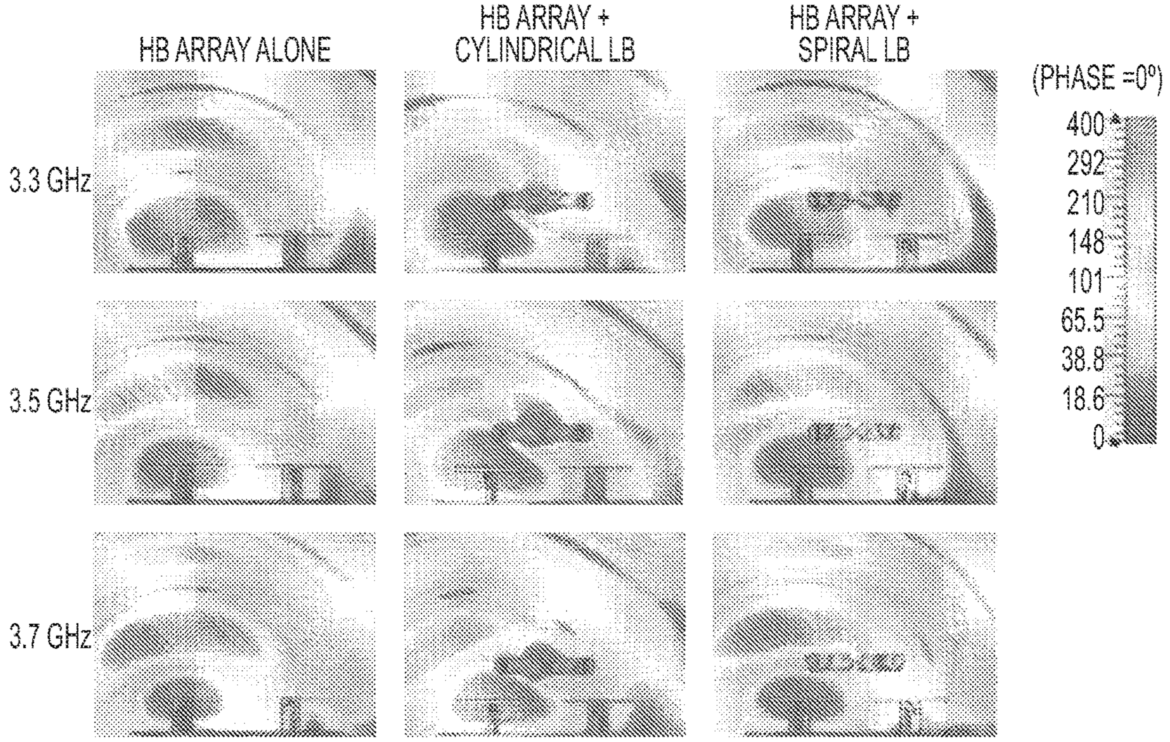
FIG. 6 is a simulation result diagram of an antenna.

All filtering radiation units are arrayed to form a low-frequency antenna, and all high-frequency radiation units are arrayed to form a high-frequency antenna. For example, the low-frequency antenna may be applied as an FDD antenna, and the high-frequency antenna may be applied as a TDD antenna. Therefore, an impact of beams of the FDD antenna on those of the TDD antenna may be effectively weakened, a beam coverage index of the TDD antenna is met, and a port isolation index is greatly improved to realize the FDD+TDD antenna. FIG. 6 is a simulation result diagram of the antenna. The leftmost column is a high-frequency 2D electric field in the absence of any low-frequency oscillator, the middle column is a high-frequency 2D electric field in the presence of an ordinary low-frequency oscillator, and the rightmost column is a high-frequency 2D electric field with a filtering radiation unit in place of an ordinary low-frequency oscillator. It can be seen that the use of the microstrip line filtering radiation oscillator greatly improves patterns of the antenna, which can meet the beam coverage index of the antenna and improve the port isolation.

The above description of the disclosed embodiments enables a person skilled in the art to implement or use the present invention. Various modifications to these embodiments are obvious to a person skilled in the art, and the general principles defined in this specification may be implemented in other embodiments without departing from the spirit and scope of the present invention. Therefore, the present invention is not intended to be limited to these embodiments illustrated in this specification, but shall be construed in the widest scope consistent with the principles and novel features disclosed in this specification.

What is claimed is:

1. A microstrip line filtering radiation oscillator, comprising a substrate, wherein a plurality of first metal sheets that are parallel to each other and are arranged in intervals of zigzag are provided on a front surface of the substrate, a plurality of second metal sheets that are parallel to each other and are arranged in intervals of zigzag are provided on a back surface of the substrate, and the first metal sheets and the second metal sheets are correspondingly staggered without completely overlapping and coupled by a coupling part running through the substrate.

2. The microstrip line filtering radiation oscillator according to claim 1, wherein both the first metal sheet and the second metal sheet comprise two end edges that are parallel to each other, the end edges are parallel to an edge of the substrate, the two end edges are connected by two connecting edges, and an angle between at least one of the two connecting edges and the end edge is an obtuse angle.

3. The microstrip line filtering radiation oscillator according to claim 2, wherein in a normal direction of the substrate, the first metal sheet and the second metal sheet that are staggered with each other have a coincident end edge.

4. A filtering radiation unit, comprising at least one oscillator according to claim 1.

5. The filtering radiation unit according to claim 4, wherein the filtering radiation unit comprises at least one oscillator pair, the oscillator pair comprises two oscillators, and substrates of the two oscillators are integrally connected.

6. The filtering radiation unit according to claim 5, wherein a connection line between the two substrates is parallel to connection lines between all the first metal sheets.

7. The filtering radiation unit according to claim 6, wherein the filtering radiation unit comprises two oscillator pairs, and connection directions of substrates in the two oscillator pairs are perpendicular to each other.

8. An antenna, comprising at least one filtering radiation unit according to claim 7.

9. The antenna according to claim 8, wherein several high-frequency radiation units are arranged on a peripheral side of each filtering radiation unit.

10. The antenna according to claim 9, wherein four high-frequency radiation units uniformly distributed along a circumference are arranged on the peripheral side of the each filtering radiation unit.

* * * * *